United States Patent
Ryu et al.

(10) Patent No.: US 7,986,699 B2
(45) Date of Patent: Jul. 26, 2011

(54) METHOD FOR DOWNLINK PACKET SCHEDULING USING SERVICE DELAY TIME AND CHANNEL STATE

(75) Inventors: Seung-Wan Ryu, Yongin-Si (KR); Byung-Han Ryu, Daejeon (KR); Hyun-Hwa Seo, Yeosu-si (KR); Chul-Sik Yoon, Daejeon (KR)

(73) Assignee: Electronics and Telecommunications Research Instittue, Daejeon (KR)

( * ) Notice: Subject to any disclaimer, the term of this patent is extended or adjusted under 35 U.S.C. 154(b) by 303 days.

(21) Appl. No.: 11/574,402

(22) PCT Filed: Sep. 1, 2005

(86) PCT No.: PCT/KR2005/002897
§ 371 (c)(1),
(2), (4) Date: Feb. 27, 2007

(87) PCT Pub. No.: WO2006/025701
PCT Pub. Date: Mar. 9, 2006

(65) Prior Publication Data
US 2007/0280260 A1 Dec. 6, 2007

(30) Foreign Application Priority Data
Sep. 1, 2004 (KR) .................. 10-2004-0069495

(51) Int. Cl.
*H04L 12/28* (2006.01)
*H04L 12/56* (2006.01)
(52) U.S. Cl. .................. 370/395.4; 370/392
(58) Field of Classification Search .............. 370/329, 370/322, 395.21, 395.4, 395.41–395.43; 455/512, 453; 709/232, 250
See application file for complete search history.

(56) References Cited

U.S. PATENT DOCUMENTS

| | | | |
|---|---|---|---|
| 5,506,969 A * | 4/1996 | Wall et al. | 710/107 |
| 6,374,099 B1 * | 4/2002 | Bi et al. | 455/404.1 |
| 6,807,426 B2 * | 10/2004 | Pankaj | 455/453 |
| 6,917,812 B2 * | 7/2005 | Damnjanovic | 455/452.2 |
| 7,174,180 B2 * | 2/2007 | Andrews et al. | 455/512 |
| 2003/0039213 A1 * | 2/2003 | Holtzman et al. | 370/252 |
| 2003/0101274 A1 * | 5/2003 | Yi et al. | 709/232 |
| 2003/0198204 A1 * | 10/2003 | Taneja et al. | 370/332 |

(Continued)

FOREIGN PATENT DOCUMENTS
KR 1020030012216 A 2/2003

(Continued)

OTHER PUBLICATIONS

Andrews M., et al., "Providing Quality of Service Over a Shared Wireless Link," *IEEE Communications Magazine*, 39:150-154 (Feb. 2001).

(Continued)

*Primary Examiner* — Ayaz R Sheikh
*Assistant Examiner* — Hoang-Chuong Q Vu

(57) ABSTRACT

The present invention provides a method for downlink packet scheduling for scheduling a real-time service and a non-real-time service. The method for downlink packet scheduling includes steps of: a) classifying inputted packets based on a type of packet and storing a maximum delay time information of the packets; b) determining a user urgency of the packets by using the maximum delay time information and a channel state by using an instantaneous channel state, an average channel state, or a ratio of the instantaneous channel state and the average channel state; c) determining a priority based on the user urgency and the channel state; and d) transmitting the packets according to the priority.

2 Claims, 5 Drawing Sheets

U.S. PATENT DOCUMENTS

| | | |
|---|---|---|
| 2005/0063389 A1 | 3/2005 | Elliott et al. |
| 2005/0281278 A1* | 12/2005 | Black et al. .................... 370/412 |
| 2006/0146721 A1* | 7/2006 | Attar et al. .................... 370/238 |
| 2006/0153216 A1* | 7/2006 | Hosein et al. ................. 370/412 |
| 2006/0165091 A1* | 7/2006 | Arima et al. ............. 370/395.21 |
| 2008/0117881 A1* | 5/2008 | Golitschek Edler Von Elbwart et al. .............................. 370/335 |
| 2008/0298323 A1* | 12/2008 | Yi et al. ........................ 370/335 |

FOREIGN PATENT DOCUMENTS

| | | |
|---|---|---|
| KR | 10-2003-0060027 A | 7/2003 |
| KR | 10-2003-0080786 A | 10/2003 |
| KR | 1020040073881 A | 8/2004 |
| WO | WO 02/45362 A2 | 6/2002 |
| WO | WO 03/017572 A2 | 2/2003 |

OTHER PUBLICATIONS

Jalali A., et al., "Data Throughput of CDMA-HDR a High Efficiency-High Data Rate Personal Communication Wireless System," *IEEE, Proceeding of VTC 2000*, pp. 1854-1858 (Jul. 2000).

Yoo S.J., et al., "Wireless Delay Proportional Service (WDPS) Scheduling Algorithm for Differentiated Service in Wireless Networks with Location-Dependent Errors," *IEICE Trans. Commun.*, E86-B(4):1336-1345 (Apr. 2003).

* cited by examiner

[Fig. 1]
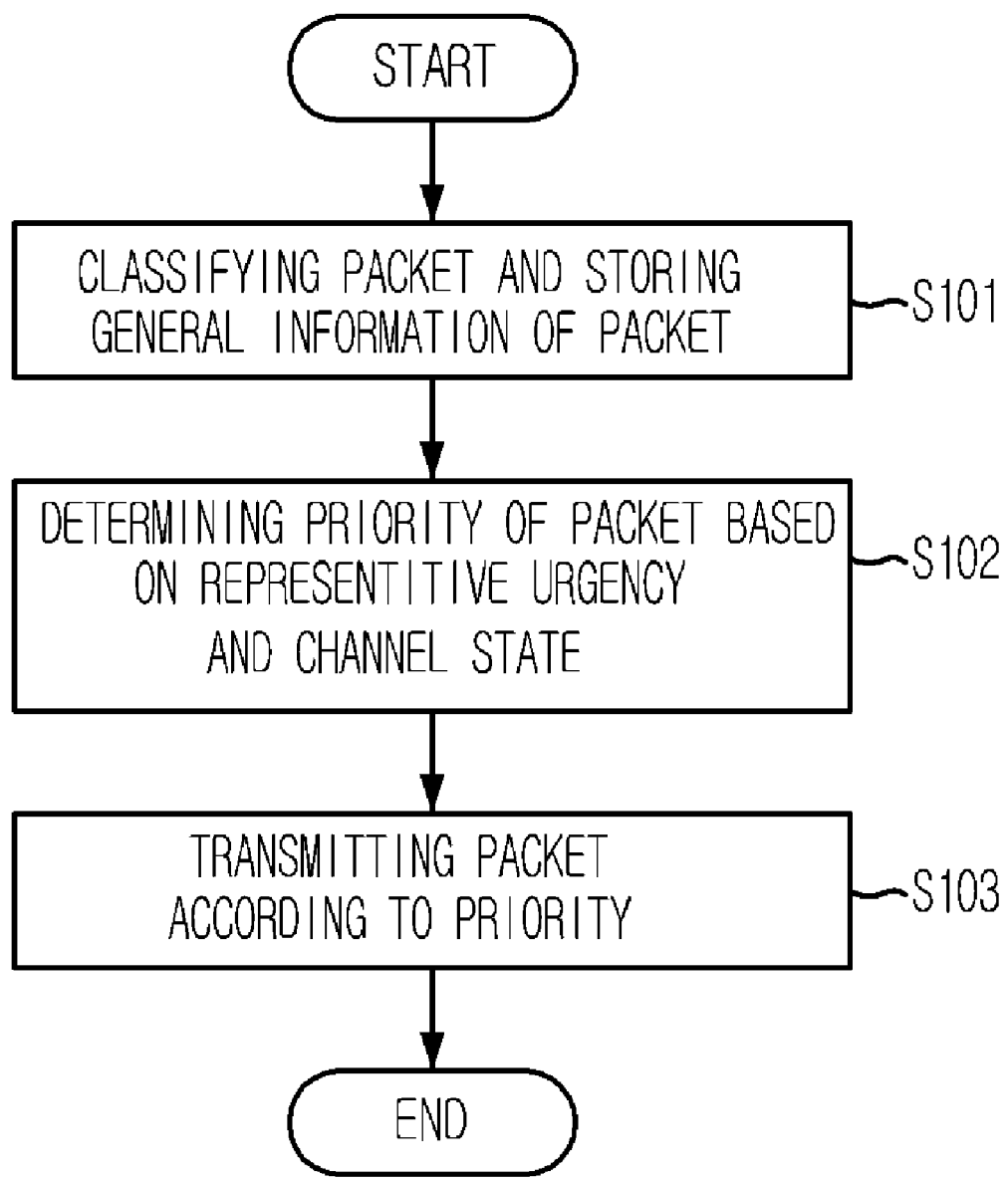

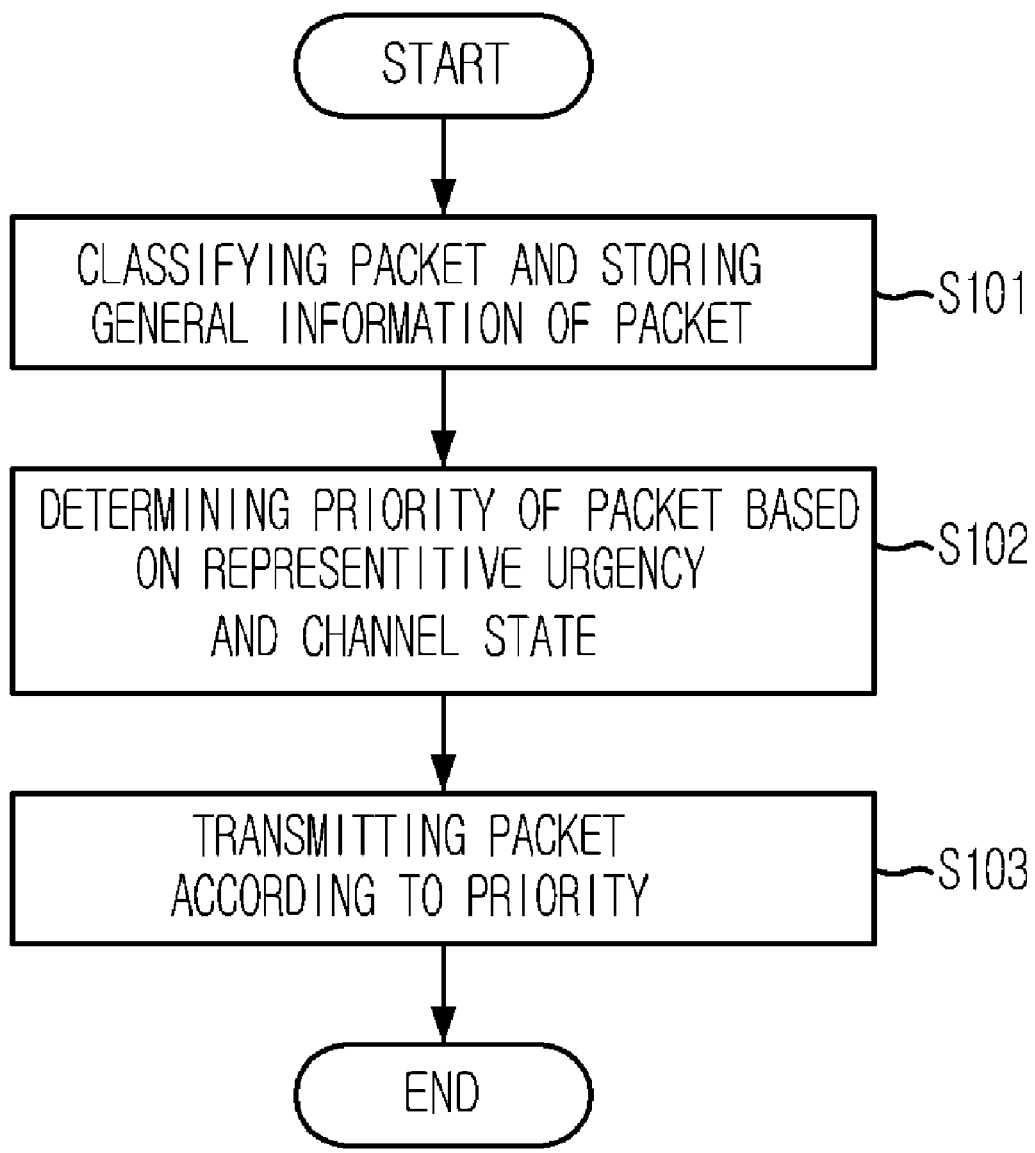

[Fig. 3]
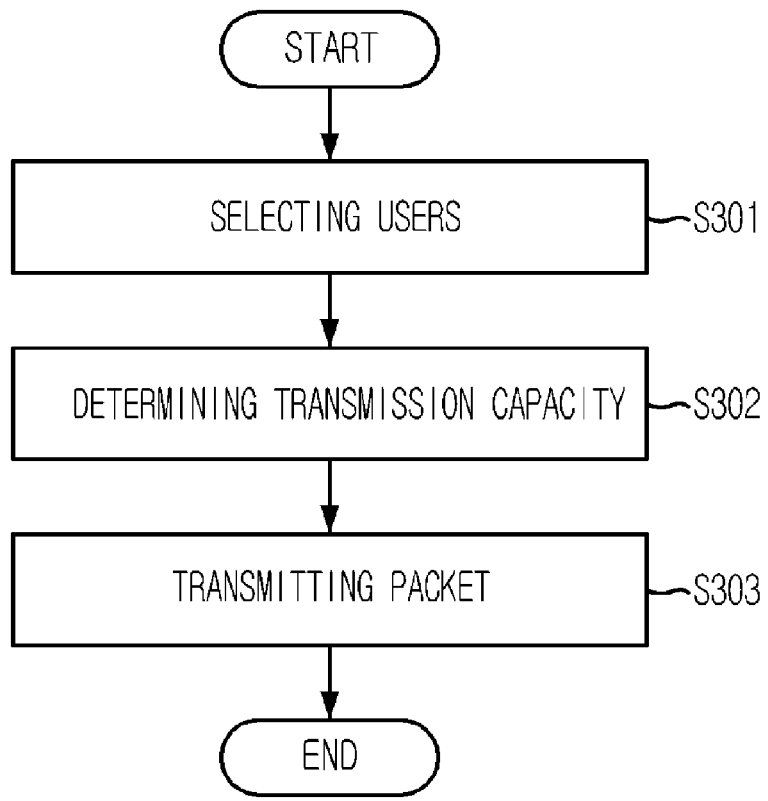
[Fig. 4]
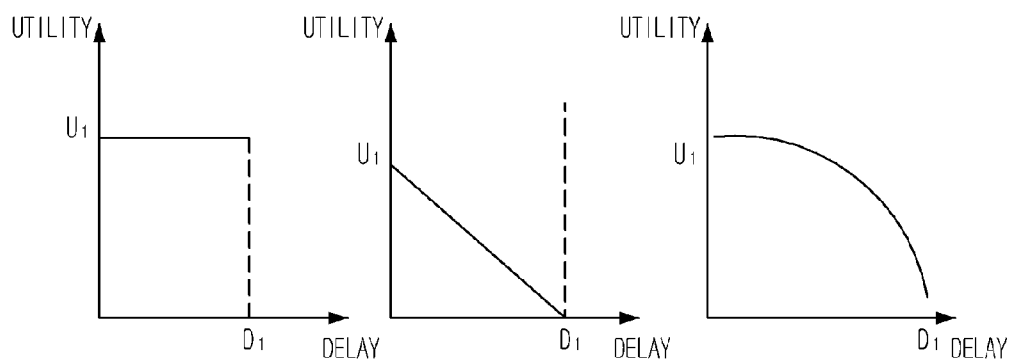

[Fig. 5]
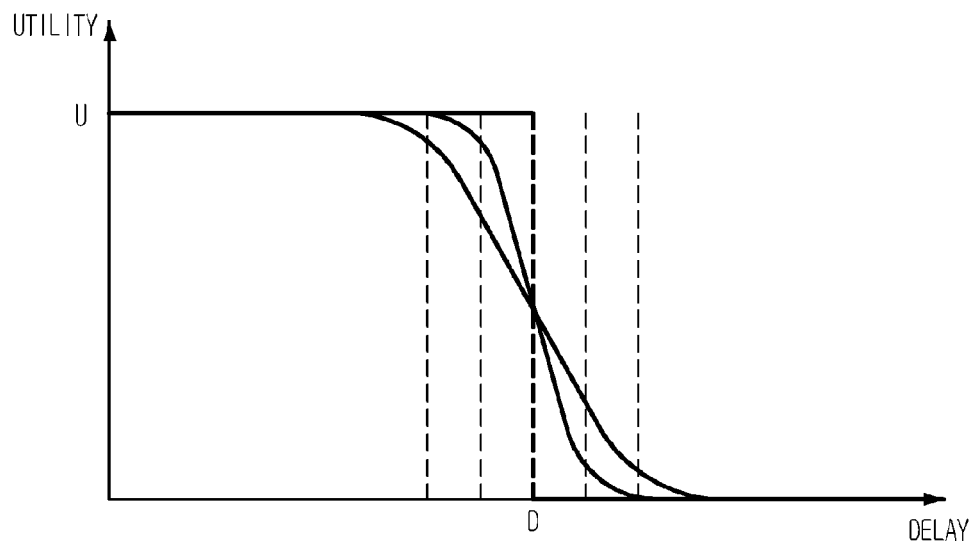
[Fig. 6]
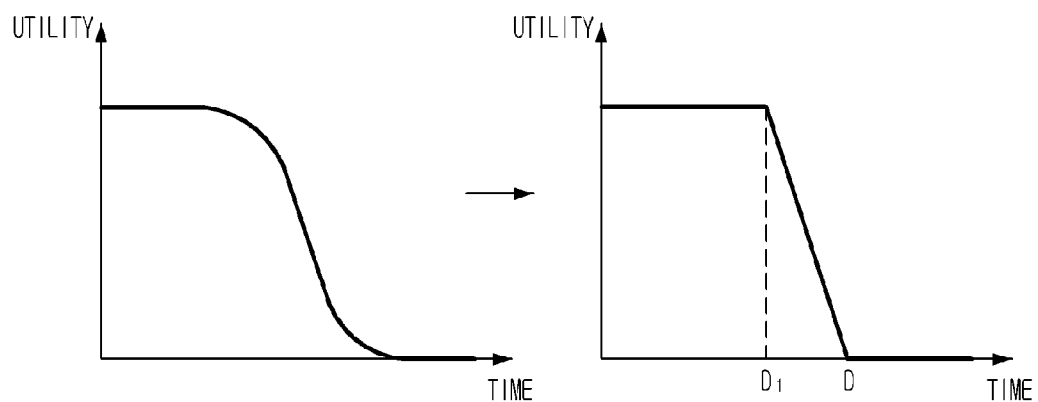

[Fig. 7]
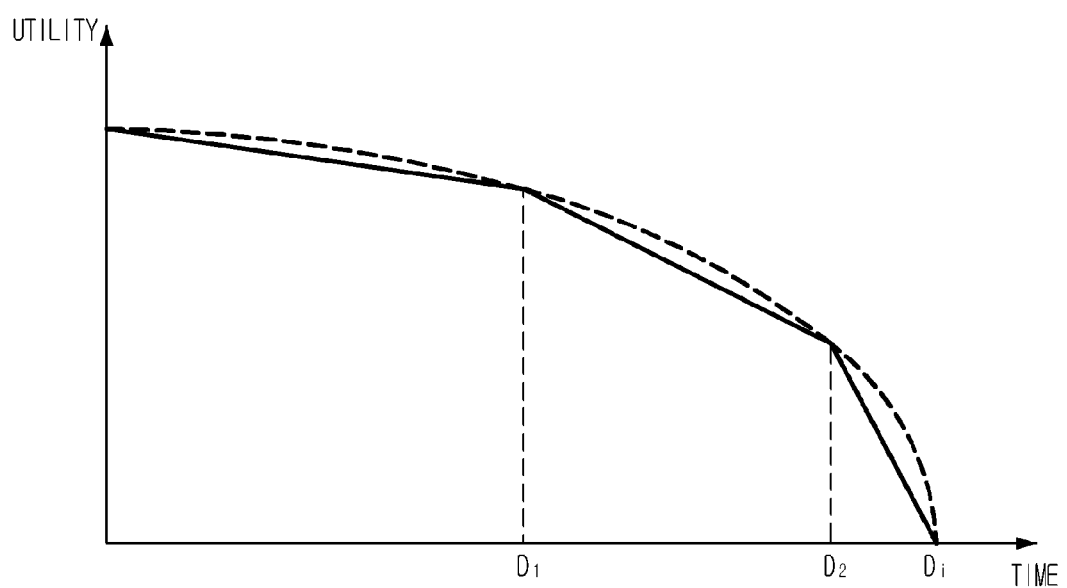

METHOD FOR DOWNLINK PACKET SCHEDULING USING SERVICE DELAY TIME AND CHANNEL STATE

TECHNICAL FIELD

The present invention relates to a method for downlink packet scheduling using a service delay time and a channel state; and, more particularly, a method for downlink packet scheduling for scheduling a real-time service and a non-real-time service effectively based on a traffic characteristic under a condition that a real-time traffic and a non-real-time traffic are transmitted in a telecommunication system.

BACKGROUND ART

A conventional packet scheduling method under a wireless communication environment is provided for a CDMA-1x-EVDO (HDR). The conventional packet scheduling method for a data service under a CDMA environment is designed for maximizing throughput of a wireless communication system with enlarging amount of data in response to characteristics of the wireless environment.

It is well known by the people skilled in the art that, as the conventional packet scheduling method, there are a Proportional Fair (PF) method, a Modified-Largest Weighted Delay First (M-LWDF) method, and a proportional delay scheduling method.

Design objective of the PF algorithm is to maximize long-term throughput of a user equipment (UE) whose current channel status, i.e., achievable data rate is better as compared with an average throughput. It is assumed that $R_k(t)$ and $T_k(t)$ are the current achievable data rate and the estimate of average throughput of a user k at a timeslot t. Then, in the PF algorithm, an average throughput $T_k(t)$ can be determined as a following equation 1.

$$T_k(t+1) = \begin{cases} (1-1/t_c)T_k(t) + 1/t_c R_k(t), & k = k^* \\ (1-1/t_c)T_k(t), & k \neq k^* \end{cases}$$ [Equation 1]

Where, k is one of a present user set, i.e., plural users; k* is a predetermined user receiving a data during a previous timeslot; and $t_c$ is a parameter of a low pass filtering for obtaining the moving average of throughput $T_k(t)$. Generally, 1000 timeslots is recommended as $t_c$.

As following equation 2, a predetermined user with the highest ratio of $$R_k(t)/T_k(t)$$

among the plural users will receive transmission from a base station (BS) at each scheduling time. Herein, with a reference, ties are broken randomly.

$$k^* = \operatorname*{argmax}_{k} \frac{R_k(t)}{T_k(t)}$$ [Equation 2]

However, since the PF algorithm is designed to support only data services in CDMA-1x-EVDO system, it can not support real-time services such as a voice service and a real-time video streaming service.

Further, the PF algorithm is not suitable for a relatively short-time service because of a low pass filtering used for calculating the moving average of throughput $T_k(t)$.

Meanwhile, the M-LWDF algorithm was proposed to support not only non-real-time data services but also almost real-time services such as video streaming services in CDMA-1x-EVDO (HDR) system. Design objective is to maintain delay of each traffic smaller than a predefined threshold value with probability.

Delay and throughput requirements of the M-LWDF algorithm are described as the following equation 3.

$$Pr\{W_k > \tau_k\} \leq \delta_k$$

$$T_k < t_k$$ [Equation 3]

Where, $W_k$ is a Head of Line (HoL) delay value; $\tau_k$ is a maximum allowable threshold of the HOL delay; $\delta_k$ is a maximum allowable probability of exceeding $t_k$; $T_k$ is a minimum required throughput; and $t_k$ is a throughput.

Therefore, by a packet scheduling algorithm based on the above described requirements, in each time-slot t, a user k* is selected according to the scheduling priority as the following equations.

$$k^* = \operatorname*{argmax}_{k} \gamma_k W_k(t) D_k(t)$$ [Equation 4]

$$\gamma_k = a_k T_k(t)$$

$$a_k = -(\log \delta_k) \tau_k$$

Where, $D_k(t)$ is an average channel rate with respect to flow k; $W_k(t)$ is a HOL delay of the k; and $\gamma_k$ is a predetermined positive value.

The M-LWDF algorithm can provide a preferred service by setting an appropriate value of each parameter $\gamma_k$ for each k to thereby satisfy the above delay requirements. Herein, the $\gamma_k$ plays an important role for determining a scheduling priority. However, it is practically difficult to find an optimal value of $\gamma_k$ for each traffic; and, as a result, $\gamma_k$ intuitively determined cannot be preferable for the wireless communication system.

Lastly, the proportional delay scheduling used for transmitting a packet data is described hereinafter.

A Priority Function (PF) used for the proportional delay scheduling is calculated by a user packet delay time. The PF of a user is adjusted when a delay value of the user is in excess of the delay threshold.

For example, a delay function used in PF calculation is calculated by a first average data rate required to all users in activated set having uncertain data and a second average data rate previously arranged to each user.

For increasing a delay sensitiveness, the algorithm for use in the proportional delay scheduling method adjusts the PF and provides an appropriate delay request and a consistent scheduling; and, as a result, the algorithm can support a exceptional or predetermined delay request from each user.

It is assumed that there is a delay requirement time of users "d" and each base station allocates a delay threshold delay $\tau_i$ to each user.

If a data rate of each user is called as "DRC" and throughput is called as "T" a proportional pair (or priority function) is derived as DRC/T or (DRC/T)g(d). Herein, said g(d) means a threshold function of a user d.

Further, a threshold function of a predetermined user $d_i$ can be defined as the equation $g(d_i)=1+k^*(\max(0,(d_i-\tau_i))$. Therefore, a scheduling priority function is derived as the equation $PF_i=(DRC_i/T_i)g(d_i)$. The above described scheduling method can perform variable delay functions, each corresponding to a requirement, a capability, and a range of communication system. However, it can not support a packet scheduling according to a channel state.

The conventional scheduling methods handle a packet scheduling in CDMA-EVDO (HDR); focus on effective packet scheduling about a non-real-time traffic service rather than a real-time service such as a voice and a streaming. Thus, there is a problem that the conventional scheduling methods are inappropriate under a mixed traffic environment including a real-time traffic and a non-real-time traffic.

In a mobile communication system based on a packet traffic except for a Universal Mobile Telecommunication System (UMTS), as one of $3^{rd}$ generation system based on W-CDMA, which provides a scheduling about an interactive service, a background service, and a streaming service but a voice service, there is needed an algorithm for supporting a data scheduling in response to characteristics of a real-time traffic and a non-real-time traffic since the real-time traffic and the non-real-time traffic should be scheduled. With reference, in UMTS, the voice service is provided through a separate channel, i.e., the voice service and other services such as the interactive service, the background service, and the streaming service are not commonly provided through the same channel.

In addition, there is required a packet scheduling method for transmitting each packet to each of plural users per every timeslot (TS), not transmitting packets to only one user selected per every timeslot (TS) like a CDMA-EVDO. Also, it is required that a packet scheduling method can be adaptive and effective for providing a packet transmission in response to an amount of traffics and a construction of traffics varied according to time.

That is, for improving a communication service quality, there is required a packet scheduling method which is for supporting a scheduling in response to a characteristic of a real-time traffic and a delay sensitively; providing a scheduling based on a channel state and a delay requirement, which relate to a throughput, for effectively transmitting a non-real-time traffic affected by the throughput; and for adaptively and effectively improving a service quality considering to amount of traffic and a construction change of transmitted packets according to the time.

DISCLOSURE OF INVENTION

Technical Problem

It is, therefore, an object of the present invention to provide a method for downlink packet scheduling for scheduling real-time services such as a voice service and non-real-time services such as a data service effectively based on a priority representing a characteristic of incoming traffic and a wireless channel state under a telecommunication system having an environment that real-time traffics and non-real-time traffics are mixed.

It is, therefore, another object of the present invention to provide a method for a downlink packet scheduling to schedule packets of multiple users simultaneously at any given scheduling time instant in the wireless system and to support packets of a real-time and a non-real-time traffic at the same time for a user.

In accordance with an aspect of the present invention, there is provided a method for downlink packet scheduling, including steps of: a) classifying inputted packets based on a type of packet and storing a maximum delay time information of the packets; b) determining a user urgency of the packets by using the maximum delay time information and a channel state by using an instantaneous channel state, an average channel state, or a ratio of the instantaneous channel state and the average channel state; c) determining a priority based on the user urgency and the channel state; and d) transmitting the packets according to the priority.

BRIEF DESCRIPTION OF THE DRAWINGS

The above and other objects and features of the present invention will become apparent from the following description of preferred embodiments taken in conjunction with the accompanying drawings, in which:

FIG. 1 is a flowchart describing a downlink packet scheduling method based on a service delay time and a channel state in accordance with the present invention;

FIG. 2 is a flowchart illustrating a process for determining a priority of each packet in accordance with the present invention;

FIG. 3 is a flowchart showing a packet transmission process according to the priority in accordance with the present invention;

FIG. 4 is a graph showing the time-utility function according to a traffic delay;

FIG. 5 is a graph for showing a process for transforming a time-utility function of real-time traffic to a 'z' shape continuous function;

FIG. 6 is a graph for showing a transformed discrete time-utility function of real-time traffic; and FIG. 7 is a graph for showing a transformed discrete time-utility function of non-real-time traffic from a continuous monotonous decrement function.

BEST MODE FOR CARRYING OUT THE INVENTION

Hereinafter, a downlink packet scheduling based on a service delay time and a channel state in accordance with the present invention will be described in detail referring to the accompanying drawings.

FIG. 1 is a flowchart describing a downlink packet scheduling method based on a service delay time and a channel state in accordance with the present invention.

First, a scheduling device receives packets which are transmitted to plural users. Then, each of the packets is classified according to its destination, i.e., a user. Several buffers are maintained for each user to handle different types of packets destined to the user separately. If there are several kinds of packets in classified packets which are destined to be transmitted to a predetermined user, each of the classified packets is stored into each type buffer, each used for each user. At this time, general information of each packet is also stored. Herein, the general information includes an arrival time, a packet type, a packet size, and a deadline. The deadline means a maximum delay time. (S101)

After then, the Scheduling Device Determines an Efficiency of Each Wireless Channel, i.e., each channel state, and a representative urgency of each user. Based on the representative urgency and the efficiency, the scheduling device determines a priority of each packet. (S102)

Lastly, based on the priority of each packet, the scheduling device transmits each packet to each user in response to the priority of each packet. (S103)

Hereinafter, the step S102 and S103 will be described in detail, referring to FIGS. 2 and 3.

FIG. 2 is a flowchart illustrating a process for determining the priority of each packet in accordance with the present invention.

First of all, the representative urgency of each user is determined as the maximum value among urgencies of HOL packets, each being in a head position of each type buffer, each used for each user. (S201) Herein, each buffer stores one-type packets in response to each type of packet. The urgency indicates a delay sensitivity of each packet and can be represented by a time-utility function. The urgency and the channel state will be described later in detail with drawings.

Also, the channel state of each user is informed. The scheduling device determines a user priority based on the representative urgency of each user and the channel state. (S202) If the channel states of all users are same, the user priority is mainly determined by the representative urgency of each user. For example, a high priority is conferred upon a real-time traffic such as a voice packet.

Finally, the scheduling device determines the priority of each packet, referring to both the user priority and a traffic characteristic depending on types of traffic, e.g., a real-time traffic and a non-real-time traffic. (S203)

FIG. 3 is a flowchart showing a packet transmission process according to the priority in accordance with the present invention.

In a communication system, the scheduling device selects or determines the number of users who receive data packets during one scheduling time unit, i.e., how many users the data packets are transmitted. (S301)

Then, in response to each channel state of the selected or determined users, a transmission capacity of each channel is determined. (S302)

Lastly, the scheduling device transmits each packet to each user based on the transmission capacity and the priority of each packet. That is, in order of high priority, a predetermined amount of packets is transmitted in response to the transmission capacity. (S303)

FIG. 4 is a graph showing the time-utility function according to a traffic delay.

Though a utility function is generally a function representing a satisfaction in accordance with a change of a predetermined condition, the time-utility function represents an urgency in accordance with a delay in the present invention.

The time-utility function is a type of a non-increasing function or monotonic decreasing function with increasing a delay up to a deadline, i.e., that a utility does not increase in proportion to delay's increment till the deadline. Thus, a time-variant urgency can be measured as an absolute value of a linear derivative of the time-utility function according to a delay.

For example, if the time-utility function of user k at time t is $U_k(t)$, a linear derivative is $U'_k(t)$ and an absolute value of instantaneous utility decrement according to a delay at the time t is derived as $|U'_k(t)|$. Herein, if all of users have same channel state, the priority for packet scheduling is determined by $|U'_k(t)|$.

The urgency according to an embodiment of the present invention can be defined as the absolute value of a utility decrement according to a delay at the time t, i.e., $|U'_k(t)|$.

As shown in FIG. 4, there are three graphs (a) to (c), each showing a relationship between a utility and a delay based on a traffic characteristic. A first graph (a) depicts the relationship of a real-time traffic; a second graph (b) depicts a relationship in a case of a non-real-time traffic; and a third graph (c) describes the relationship in another case of the non-real-time traffic. In detail, as compared with the second and third graphs (b) and (c), a utility in the case of the non-real-time traffic is gradually decreased according to delay's increase.

However, contrary to the non-real-time traffic, a utility of a real-time traffic is dramatically decreased around a deadline $D_1$ as shown in the first graph (a). The utility of the real-time traffic is represented as a non-continuous hard shape. That is, it is impossible to calculate the utility based on a linear derivative of the time-utility function. Thus, this can be solved by transforming the time-utility function to a 'z' shape continuous function which has almost similar functional characteristics.

FIG. 5 is a graph for showing a process for transforming a time-utility function of the real-time traffic to the 'z' shape continuous function.

As shown, the time-utility function of the real-time traffic, which is in non-continuous hard shape, is transformed to the 'z' shape continuous function similar to the first graph (a) shown in FIG. 4. As a result, a linear derivative of the non-continuous time-utility function of the real-time traffic can be derived.

Otherwise, the time-utility function of the non-real-time traffic is a type of the monotonous decrement function according to delay's increment. With reference, it is relatively easy to derive the monotonous decrement function by using a monotonous increment function, e.g., an exponential function.

If all of users have the same channel state, a main factor for determining the priority of the packet scheduling is the absolute value of a utility decrement according to a delay at a time t, i.e., $|U'_k(t)|$, not a value of the time-utility function at the time t $U_k(t)$. Therefore, it is possible to calculate an urgency factor by using a time-utility function of the non-real-time traffic normalized so that a maximum utility of the time-utility function is set to 1.

Accordingly, the time-utility function of the non-real-time traffic, which is a type of the monotonous decrement function, is obtained by using the monotonous increment function such as a normalized exponential function. For example, the normalized exponential function according to maximum delay time is defined as the following equation 5.

$$f(t,D_i)=\exp(at)/\exp(D_i), 0 \leq t \leq D_i \quad \text{[Equation 5]}$$

Where, 'a' is constant.

Based on the above normalized exponential function, a time-utility function of non-real-time traffic $U_{NRT}(t)$ such as the monotonous decrement function can be derived as the following equation 6.

$$U_{NRT}(t)=1-f(t,D)=1-\exp(at)/\exp(D) \quad \text{[Equation 6]}$$

Herein, a characteristic difference among various type traffics in the non-real-time traffic can be reflected by controlling a monotonous decrement ratio. For example, above 'a' is adjusted based on a detailed type of the non-real-time traffic. That is, the time-utility function is varied in response to the detailed type of the non-real-time traffic because of controllable 'a'. As a result, the priority based on the urgency is changed according to the detailed type of the non-real-time traffic.

If all of channel states are equal, the priority for a downlink packet scheduling based on the urgency according to a delay can be determined as the following equation 7.

$$|U'_{RT\text{-}Voice}(t)| \ |U'_{RT\text{-}Video}(t)| \ |U'_{NRT\text{-}Data1}(t)| \ |U'_{NRT\text{-}Data2}(t)| \quad \text{[Equation 7]}$$

Where, $U_{RT\text{-}Voice}(t)$ is a time-utility function of a voice traffic such as the real-time traffic; $U_{RT\text{-}Video}(t)$ is a time-utility function of a video traffic such as the real-time traffic; and both $U_{NRT\text{-}Data1}(t)$ and $U_{NRT\text{-}Data2}(t)$ are time-utility functions of predetermined data traffics such as the non-real-time traffic.

A packet scheduling is performed every time interval TS (Time slot). Thus, a time-utility function representing a urgency can be defined by a discrete function based on a discrete scheduling time. In this case, the priority is determined every discrete scheduling time by using a discrete time-utility function, not a continuous linear derivative of all users or all traffics.

Hereinafter, discrete time-utility functions for the real-time traffic and the non-real-time traffic will be described in FIGS. 6 and 7.

FIG. 6 is a graph for showing a transformed discrete time-utility function of the real-time traffic.

As shown, a continuous z-shape time-utility function of real-time traffic can be transformed to the discrete time-utility function. In this case, a discrete urgency $|U'_k(t)|$ is determined as the following equation 8.

$$|U'_k(t)| = \begin{cases} a, & D_1 \leq t < D \\ 0, & \text{otherwise} \end{cases} \quad \text{[Equation 8]}$$

Where, '$D_1$' is a predetermined timing when a urgency is not 0; and 'D' is a maximum delay time, i.e., a deadline.

When the original time-utility function of the real-time traffic is transformed to the discrete time-utility function, $D_1$ is a D−1, i.e., one scheduling time unit before the deadline.

However, if an actual system performs a scheduling process for N number of users during one scheduling time unit and there are too many real-time traffics among all traffics, it is occurred that some of the real-time traffics are not scheduled properly in time and, over the deadline, some of the real-time traffics can not be served, i.e., some of the real-time traffics are missed. As a result, it is possible to deteriorate a quality of communication service.

For overcoming above described problem, a real-time service should already have a urgency of a real-time traffic at a predetermined scheduling time before the deadline. For example, the urgency is needed before n times of unit timeslot from the deadline.

That is, a urgency value $|U'_k(t)|$ at a discrete time t=0, 1, 2, . . . , can be defined as the following equation 9.

$$|U'_k(t)| = \max\{|U'_k(t)|, |U'_k(t+1)|, |U'_k(t+2)| \ldots , |U'_k(t+n)|\} \quad \text{[Equation 9]}$$

Where, n is an integer.

Also, above discrete urgency can be defined as the following equation 10.

$$|U'_k(t)| = \begin{cases} a, & D - nt \leq t < D \\ 0, & \text{otherwise} \end{cases} \quad \text{[Equation 10]}$$

In this case, as above variable n of the equation 10 is adjusted in response to total received traffics and amount of real-time traffics included in the total received traffics, adaptive packet scheduling can be allowable based on amount of traffics and construction change of traffics according to the time.

For example, in case when a ratio of real-time traffics over total traffics is low, the variable n can is assigned to a low value. However, in case when a ratio of the real-time traffics over the total traffics is high, the variable n can be increased.

In addition, if a packet loss rate of real-time traffic is over a predetermined value or delay of the real-time traffic is near a deadline, the variable n is increased for reducing loss according to the delay. In this case, as compared with the non-real-time traffic, the real-time traffic has a high priority during more plural scheduling time units.

On the contrary, i.e., when amount of real-time traffics are reduced, the packet loss rate is lower than a predetermined value, which is already set, or a delay time of the real-time traffic approaches to a predetermined value, which is previously set; then, the priority of the real-time traffic is reduced by decreasing the value of the variable n.

Also, for adapting the non-real-time traffic to the real-time traffic, a continuous monotonic decreasing function is converted into a discrete monotonic decreasing function. Herein, the continuous monotonic decreasing function is split into each predetermined period; and, in each period, a linear monotonic decreasing function is reduced.

FIG. 7 is a graph for showing a transformed discrete time-utility function of the non-real-time traffic from a continuous monotonous decrement function.

As shown, an instantaneous urgency variance is determined as the following equation 11.

$$|U'_k(t)| = \begin{cases} |U^1|, & 0 \leq t < D_1, \\ |U^2|, & D_1 \leq t < D_2, \\ |U^3|, & D_2 \leq t < D, \\ 0, & \text{otherwise} \end{cases} \quad \text{[Equation 11]}$$

Where, $U^1$ is a linear derivative of a period 0 to $D_1$; $U^2$ is a linear derivative of a period $D_1$ to $D_2$; and $U^3$ is a linear derivative of a period $D_2$ to D.

Hereinafter, it will be described a channel state for determining scheduling priority with above described urgency in a method for a downlink packet scheduling based on a service delay time and the channel state in accordance with the present invention.

Generally, efficiency indicates a limited availability of a resource. In case of wireless resource, a number of a limited wireless channels (or bandwidth) is a limited available resource. Thus, each channel state of available channels is an indicator representing the efficiency. For example, the channel state represented as an intravenous channel state $R_k(t)$, an average channel state $T_k(t)$, and a ratio of the instantaneous channel state and the average channel state $R_k(t)/T_k(t)$ can be used as the indicator of the efficiency.

In preferable embodiment of the present invention, an average channel state $T_k(t)$, which is defined as the following equation 12, reflecting a moving characteristic can be used as the channel state.

$$T_k(t) = aT_k(t-1) + (1-a)R_k(t) \quad \text{[Equation 12]}$$

Where, 'a' as a parameter for calculating an moving average is in a range of 0 to 1.

Also, '1/a' is a window size of a previous channel state for determining an average channel state as the channel state.

The above mentioned method can be embodied as computer-executable codes on a computer-readable recording medium. The computer-readable recording medium is any data storage device that can store data which can be thereafter read by a computer system. Examples of the computer-readable recording medium includes read-only memory (ROM), random-access memory (RAM), CD-ROMs, magnetic tapes, floppy disks, optical data storage devices and carrier waves (such as data transmission through the Internet).

As above described, the present invention provides an effective packet scheduling method about both a real-time service such as a voice and a non-real-time service such as a data at a base station in a communication system.

In addition, under the condition that the real-time traffic and the non-real-time traffic are mixed, the present invention provides a packet scheduling method based on an urgency of delay, which is occurred due to each traffic characteristic, and a mobile channel state.

Further, the present invention provides a good service quality and improves a system capacity throughout the packet scheduling method based on the urgency of delay and the mobile channel state. Also, the present invention provides a packet scheduling method based on a traffic amount and a traffic construction varied according to time by using a priority discretely determined every time slot in order to increase a service quality.

Further, when a user is selected for transmission, a sub-channel is allocated to the user and packets of the real-time and the non-real-time traffics are loaded on the sub-channel. In this way, the UEPS scheduler offers real-time and non-real-time services simultaneously to a user. This is also one of major difference of the UEPS algorithm from the existing scheduling algorithms. The UEPS algorithm tries not only to meet QoS requirements of the real-time and the non-real-time traffics but also to maximize throughput of the non-real-time traffics. This can be achieved by using the urgency and the efficiency factors to determine the scheduling priority.

The present application contains subject matter related to Korean patent application No. 2004-69495, filed in the Korean Patent Office on Sep. 1, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

The invention claimed is:

1. A method for a downlink packet scheduling, comprising steps of:
   a) classifying an inputted packet based on a type of packet and storing a maximum delay time information of the packet, each type of packet being associated with a utility function, the maximum delay time information being a time delay at which the packet has no utility value according to the utility function;
   b) determining a user urgency of the packet based on the utility function associated with the type of packet and a channel state by using an instantaneous channel state, an average channel state, or a ratio of the instantaneous channel state and the average channel state;
   c) determining a priority based on the user urgency obtained from the utility function and the channel state; and
   d) transmitting the packet according to the priority,
   wherein the user urgency has the maximum value among the urgency of Head of Line (HOL) packets in buffers which have the kind of traffic of each user,
   wherein the urgency is represented as a first derivative function of a time utility function for each kind of traffic, and
   wherein the urgency is represented as the following equation when the kind of traffic is a real-time traffic, $$|U'_k(t)| = \begin{cases} a, & D - nt \leq t < D \\ 0, & \text{otherwise} \end{cases}$$

wherein, $|U'_k(t)|$ is an urgency of the real-time traffic, n is an integer, a is a constant, and D is a maximum delay time (deadline).

2. A method for a downlink packet scheduling, comprising steps of:
   a) classifying an inputted packet based on a type of packet and storing a maximum delay time information of the packet, each type of packet being associated with a utility function, the maximum delay time information being a time delay at which the packet has no utility value according to the utility function;
   b) determining a user urgency of the packet based on the utility function associated with the type of packet and a channel state by using an instantaneous channel state, an average channel state, or a ratio of the instantaneous channel state and the average channel state;
   c) determining a priority based on the user urgency obtained from the utility function and the channel state; and
   d) transmitting the packet according to the priority,
   wherein the user urgency has the maximum value among the urgency of Head of Line (HOL) packets in buffers which have the kind of traffic of each user,
   wherein the urgency is represented as a first derivative function of a time utility function for each kind of traffic, and
   wherein the urgency is represented as the following equation when the kind of traffic is a non real-time traffic, $$U_{NRt}(t) = 1 - \exp(at)/\exp(D)$$

wherein, $U_{NRt}(t)$ is the urgency of the non real-time traffic, 'a' is a variable, and D is a maximum delay time.

* * * * *